Oct. 15, 1963  J. L. STONEHAM, JR  3,106,778
TYPE SIZE GAUGE
Filed May 2, 1961

INVENTOR.
JOHN L. STONEHAM JR.
BY

United States Patent Office 3,106,778
Patented Oct. 15, 1963

3,106,778
TYPE SIZE GAUGE
John L. Stoneham, Jr., Queens Village, N.Y.
(1011 Hillside Ave., New Hyde Park, Long Island, N.Y.)
Filed May 2, 1961, Ser. No. 107,100
1 Claim. (Cl. 33—1)

This invention relates to means to measure and classify printed type faces and more particularly to means for identifying the sizes of the various types of faces or processes.

When a printer is asked to print a piece of work from a sample or according to customer's specifications it is first necessary for him to identify the type, size and style.

In view of the many different sizes, styles and processes of type, even the most experienced printer cannot rely on his own eye but must compare the sample with reference books setting forth the different sizes and styles of type.

Even with the proper reference books at hand it is very difficult to measure microscopic differences in size.

The most common styles or processes of type are Foundry, Linotype, Intertype and Monotype. Sometimes one face is made by all four processes and is called by a general name for all four. However, sometimes there are small differences in size between these processes, that is, even though the bodies of the different styles may be the same dimension or point size, the raised impressions of the faces may be of slightly different size.

The present invention greatly simplifies this problem by providing a transparent sheet smaller than an ordinary book page upon which the different size and style faces are printed in a conveniently classified form.

The transparent gauge is laid over the work to be identified and very accurate identification may be made quite easily, even of microscopic differences in size. The printing on the gauge is preferably red or some color other than black, so that as the gauge is moved relative the letter being examined any discrepancies in size and general shape will be readily apparent. The transparent gauge or sheet preferably has a transparent cover sheet placed over the printed surface and both of the transparent sheets should be of sufficiently good optical quality to prevent any optical distortion when measuring. If desired an additional transparent cover sheet may be placed on the back of the gauge. These sheets are preferably of a good grade of plastic having sufficient stiffness to withstand wear and tear.

A convenient index is provided for quickly identifying the name and/or size of the unknown type face. The index may take the form of an alphabetical listing on a card physically attached to the gauge or the index may be conveniently posted at the desk of the user.

Accordingly, a principal object of the invention is to provide new and improved means for measuring type faces.

Another object of the invention is to provide new and improved means for measuring and identifying type faces.

Another object of the invention is to provide new and improved means for measuring and identifying type faces comprising a transparent gauge having conveniently classified selections of the commonly used type faces printed thereon, whereby the gauge may be laid over the unknown work and adjusted very accurately for perfect optical matching.

These and other objects of the invention will be apparent from the following specification and drawings, of which:

Referring to the figures the invention comprises a transparent sheet 1 having printed thereon a selection of the most commonly used type faces which are conveniently arranged and classified according to their name and size, for instance, each class of type is placed together and the available point sizes are listed in order. For instance, Scale No. 1 shows Alternate Gothic Style in six different point sizes running from Pt. 6 to Pt. 18. Scale No. 4 shows Bulmer style in nine different points.

In certain cases, one face may be made in four different processes, namely, Foundry, Linotype, Intertype and Monotype, for instance, referring to Scale No. 16 in the Pt. 10 size, the Linotype indicated as "L" and Monotype indicated as "M" have the same size impression but the Foundry indicated as "F" and the Intertype indicated as "I" have a different size impression, even though all the bodies are Pt. 10. With this device it is relatively easy to avoid an expensive error in printing large quantities of material.

Figure 1:
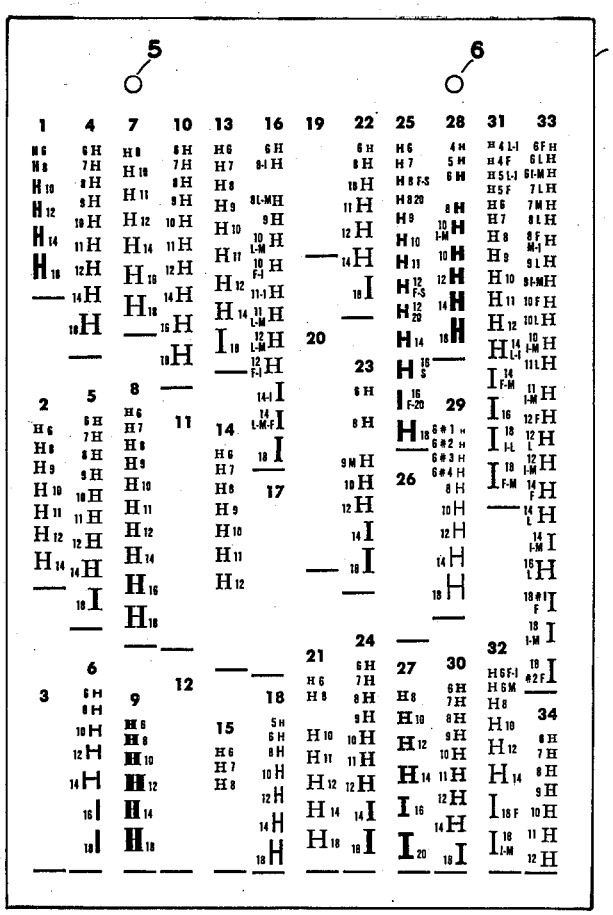
FIG. 1 is a plan view of an embodiment of the invention.
Figure 2:
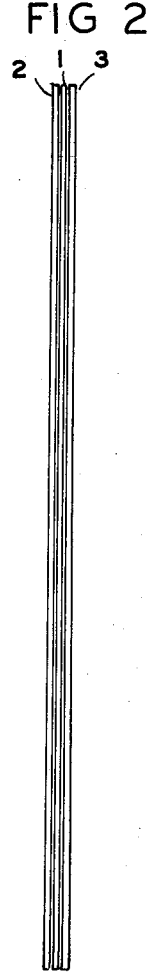
FIG. 2 is a side view of the embodiment of FIG. 1.
Figure 3:
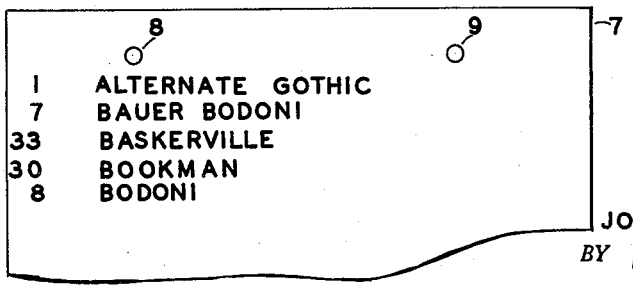
FIG. 3 is a plan view of index means for the embodiment of FIG. 1.

There are arrangements made on the gauge of FIG. 1 for 34 different scales, some of these scales being left blank for insertion of other styles if required. Additional sheets may be added if desired, to include more scales.

The transparent sheet 1 is preferably covered with a transparent cover sheet 2 on the printed side to protect the printing from wear. If desired, a third transparent sheet 3 may be added to the back of the sheet 1. All of these sheets may be of a good grade of transparent plastic having sufficient amount of stiffness to withstand ordinary wear and tear and being of sufficiently clear optical quality for the purpose intended of matching very accurately, for size measurements. The printing on the gauge is preferably in red for eye ease in matching against black letters which are the most commonly used. The gauge is printed in transparent ink for ease in matching.

Suitable mounting holes 5 and 6 preferably are punched in the sheets for the purpose of either mounting on a wall or on a ring-type binder if more than one sheet is required by the number of type styles desired.

A suitable separate index is provided which may comprise a page or sheet 7 having printed thereon an alphabetical listing of the different styles displayed, indexed with their scale numbers, for instance, Scale No. 1 on FIG. 1 shows Alternate Gothic, Scale No. 4 shows Bulmer, Scale No. 8 shows Bodoni, etc. If desired, numerical indices may also be provided.

The index sheet 7 may be a plastic sheet but need not be transparent and it preferably has mounting holes 8 and 9 so that it may be conveniently mounted on a wall or desk or mounted on a ring binder together with the gauge 1.

Therefore, the present invention has the following functions and advantages:

(1) Determines size of type used in printed matter.

(2) Concerns itself with different general processes of type: (a) Foundry, (b) Linotype, (c) Intertype, (d) Monotype. Sometimes one face is made by all four processes and is called by a general name for all four. However, sometimes there are small differences in size between these processes. When there is a difference the gauge shows it and allows for it. These differences I call variants. For instance, the Century Expanded, Scale 33, FIG. 1, on Pt. 12, there is a difference in size between Foundry, Linotype, Intertype and Monotype. On the code it shows as 12L for the Linotype, 12I–M for Intertype and Monotype 12F for the Foundry. Where there is a variant such as I just explained this gauge shows it.

(3) It is also useful for those people who plan different advertisements as it shows the exact heights of type and therefore gives them the space the various faces will take.

(4) The prime usefulness of the gauge is that it bridges the gap of long experience required in being able to know what size type various printed matter is.

(5) The novice and even the experienced printer will not trust his own sight or experience in determining sizes of type without consulting reference books and then comparing it for size. Before they can do this they have to know what process made the type, then they have to get the book if it is available at work, find the type face in which they are interested in the book, and then start to compare the printed matter and the book until they find the size. This gauge bridges years of experience for the novice, eliminates all the above consultation with books, eliminates the expense of the books, eliminates all the time involved and shows immediately the size. Also if there is a variant, it shows what process the type was made by and therefore allows them to duplicate.

(6) When printing is set in a printing shop, proofreaders not only have to read for typographical errors but they have to check the customer's specification, such as layout, sizes of type used, etc. The proofreader will find this invention useful to check to see if the right size of type was used without consulting reference books, etc.

Many modifications may be made by those who desire to practice the invention without departing from the scope thereof which is defined by the following claim.

I claim:

In a printer's gauge means to identify printed type faces by style, size and process whether or not the type face terminates at the edge of the type body comprising;
  a first sheet of transparent material,
  a plurality of letters of different type faces and sizes printed on said sheet, letters of each different style being arranged in columns according to the available sizes and processes,
  a transparent cover sheet affixed to said first sheet over said printing,
  said sheets being of sufficiently pure optical quality to minimize optical distortion,
  whereby said gauge may be laid over printed material to be measured,
  and an index of said different type faces, sizes, and processes adapted to be foldably and removably connected to said first sheet.

References Cited in the file of this patent
UNITED STATES PATENTS

| | | |
|---|---|---|
| 1,695,423 | Gyllenberg | Dec. 18, 1928 |
| 1,736,445 | Jannenga et al. | Nov. 19, 1929 |
| 2,098,323 | Wadsworth | Nov. 9, 1937 |
| 2,376,811 | Rigby | May 22, 1945 |
| 2,720,028 | Wolf | Oct. 11, 1955 |
| 2,876,119 | Dithmar et al. | Mar. 3, 1959 |
| 2,891,314 | Haschek | June 23, 1959 |